United States Patent [19]
Lee

[11] Patent Number: 6,061,563
[45] Date of Patent: May 9, 2000

[54] METHOD OF MOVING STATION IN WIRELESS LAN

[75] Inventor: Myung-Hwan Lee, Seoul, Rep. of Korea

[73] Assignee: LG Information & Communication, Ltd., Seoul, Rep. of Korea

[21] Appl. No.: 08/919,122

[22] Filed: Aug. 28, 1997

[30] Foreign Application Priority Data

Aug. 29, 1996 [KR] Rep. of Korea ................. 96-36447

[51] Int. Cl.[7] ................................................. H04Q 7/20
[52] U.S. Cl. ........................ 455/435; 455/432; 455/436
[58] Field of Search ................................. 455/422, 432, 455/433, 435, 436, 466

[56] References Cited

U.S. PATENT DOCUMENTS

| | | | |
|---|---|---|---|
| 5,335,262 | 8/1994 | Oguchi et al. ........................ | 455/435 |
| 5,457,680 | 10/1995 | Kamm et al. ........................ | 455/432 |
| 5,519,706 | 5/1996 | Bantz et al. ........................ | 455/435 |
| 5,629,975 | 5/1997 | Tiedemann, Jr. et al. ............ | 455/435 |
| 5,819,178 | 10/1998 | Cropper ............................. | 455/433 |

OTHER PUBLICATIONS

Veeraraghavan, "Mobility and connection management in a wireless ATM LAN", pp. 50–68, Jan. 997.

Raychaudhuri, "WATMnet: A prototype wireless ATM system for multimedia personal communication" pp. 469–477, 1996.

Gibson, "The mobile communications handbook" pp. 294–297, Dec. 1995.

*Primary Examiner*—Dwayne D. Bost
*Assistant Examiner*—Nay Maung
*Attorney, Agent, or Firm*—Jacobson, Price, Holman & Stern, PLLC

[57] ABSTRACT

A method of moving a station in a wireless LAN, includes the step of: a station recognizing that a first access point of a first communication area is connected thereto, when the station is located in the first communication area, and storing corresponding connection information in an initial access point record area of its storage. The station requires the first access point to cancel the connection with the station, when the station moves from the first communication area to second communication area. The station requires a second access point of the second communication area to be connected thereto, when the station moves to the second communication area. Then, the second access point registers the station on the connection station list stored in its storage. The station transmits connection information about the first access point, stored in its initial access point record area, to the second access point, to inform the second access point that the station moved from the first communication area.

1 Claim, 4 Drawing Sheets

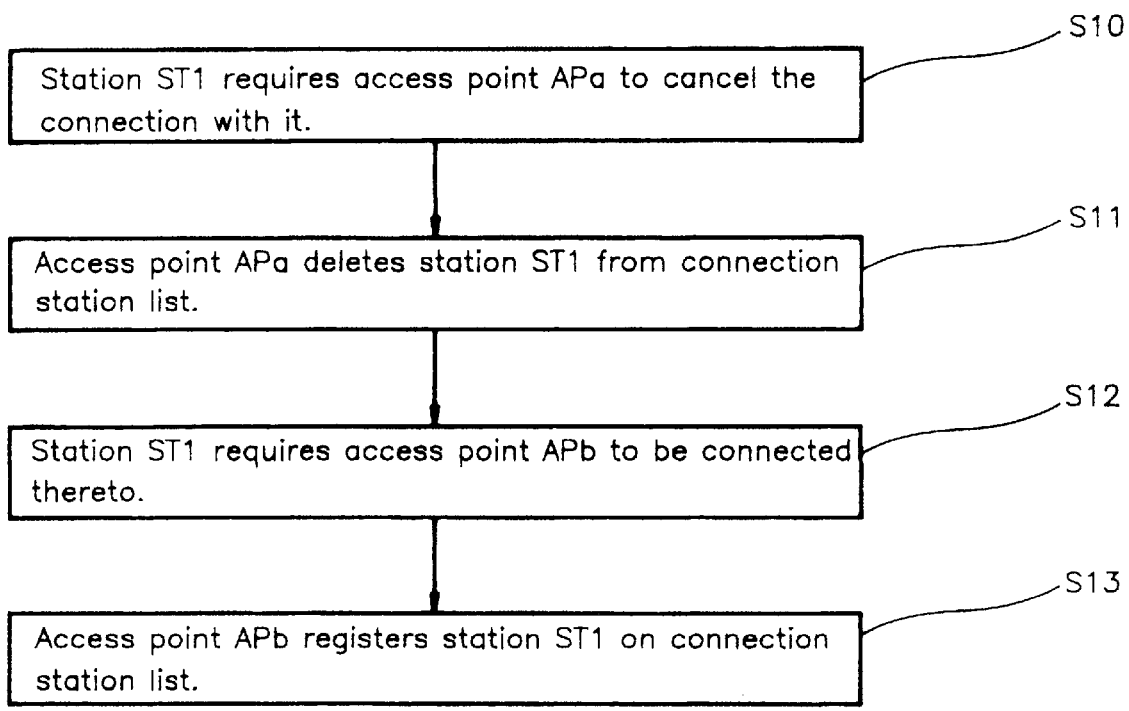

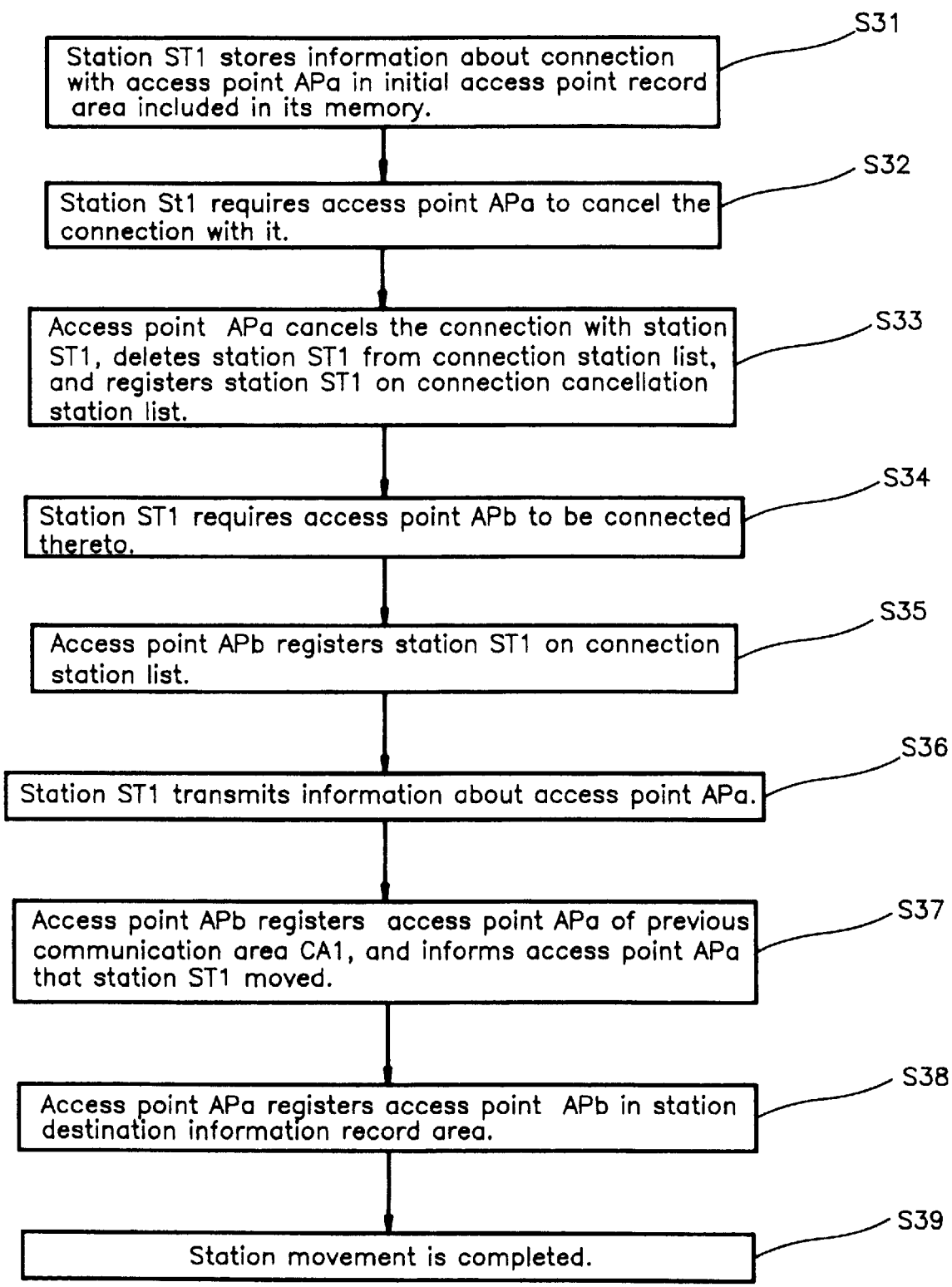

METHOD OF MOVING STATION IN WIRELESS LAN

BACKGROUND OF THE INVENTION

1. Field of the Invention

The present invention relates to a wireless local area network (LAN), specifically, to a method of moving a station in a wireless LAN, in which, when a station moves from a communication area having an access point to another communication area having an access point, information about the access points of a communication area where the station was located is transmitted to the access points of a communication are to which the station will move, to thereby perform smooth communication with the moved station.

2. Discussion of Related Art

A wireless LAN, generally, includes a plurality of access points APa and APb, and a plurality of stations ST1 to ST6. Access points APa and APb are connected to each other through a wire network, and they make an interface with stations ST1 to ST6 through a radio channel of common air interface (CAI). When communication is carried out for transmitting or receiving data, stations ST1 to ST6 make an interface with access points APa and APb through the CAI, and access points APa and APb are communicated with stations ST1 to ST6 through the radio channel, thereby transmitting and receiving data. Access points APa and APb transmit data received from the stations to each other through the CAI, and transmit the data, received through the wire network, to the stations by way of the radio channel.

FIG. 2 shows the configuration of stations ST1 to ST6 and access points APa and APb. Referring to FIG. 2, each station 20 includes: a station controller 21 for processing and controlling the internal signal of the station; a CAI 22 for transmitting information to access point 30; a storage 23 for storing connection information; and a terminal interface 24 for interfacing a connection signal between terminals. Access point 30 includes: an access point controller 31 for processing and controlling the signal of the access point; an access point CAI 32 for interfacing with information transmitted from station 20; an access point storage 33 having an area where connection cancellation and connection registration station lists are stored, and destination information about corresponding station is recorded; and a wire LAN interface 34 for interfacing with other access points.

When stations ST1 to ST6 move in this wireless LAN, communication with a moved station is performed using radio channel CAI 22 shown in FIG. 2. That is, access points APa and APb are physically connected to the wire network, and interface the communication between the stations located in communication areas CA1 and CA2 which are managed by them. Otherwise, the access points transmit/receive data to/from each other through the wire network, to interface the communication between the stations located in other communication areas CA1 and CA2.

In the aforementioned wireless LAN, when station ST1 located in communication area CA1 moves to communication area CA2, for example, the station movement is performed using the method shown in FIG. 3. That is, when station ST1 moves from communication area CA1 to communication area CA2, if station ST1 requires first access point APa to cancel the connection with the station by way of CAI 22 (S10), first access point APa deletes station ST1 on a connection station list stored in its storage 33 (S11). If station ST1 requires second access point APb to be connected thereto (S12), second access point APb registers station ST1 in the connection station list stored in its storage (S13). By doing so, the station movement is completed.

When station ST1 moves from first communication area CA1 to second communication area CA2 in the above-described manner, first access point APa does not know the communication area to which station ST1 moved, even if it recognizes the movement of station ST1. Accordingly, other stations ST2 and ST3 located in communication area CA1, which were communicated with station ST1, cannot be communicated with station ST1 any more.

SUMMARY OF THE INVENTION

Accordingly, the present invention is directed to a method of moving a station in a wireless LAN that substantially obviates one or more of the problems due to limitations and disadvantages of the related art.

An object of the present invention is to provide a method of moving a station in a wireless LAN, in which, when a station moves from a communication area having an access point to another communication area having an access point, information about the access point of a communication area where the station was located is sent to the access point of a communication area to which the station will move, to perform smooth communication with the moved station.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method of moving a station in a wireless LAN includes the steps of: a station recognizing that a first access point of a first communication area is connected thereto, when the station is located in the first communication area, and storing corresponding connection information in an initial access point record area of its storage; the station requiring the first access point to cancel the connection with the station, when the station moves from the first communication area to second communication area; the first access point cancelling the connection with the station, deleting the station on a connection station list stored in its storage, simultaneously, registering the station on its connection cancellation station list; the station requiring a second access point of the second communication area to be connected thereto, when the station moves to the second communication area; the second access point registering the station on the connection station list stored in its storage; the station transmitting connection information about the first access point, stored in its initial access point record area, to the second access point, to inform the second access point that the station moved from the first communication area; the second access point registering the information about the first access point of the first communication area where the station was located in its storage, and then informing the first access point that the station moved to the second communication area of the second access point; and the first access point registering the second access point in a station destination information record area included in its storage.

According to the present invention, when a station moves from a communication area having an access point to another communication area having an access point, information about the access point of a communication area where the station was located is sent to the access point of a communication area to which the station will move, to perform smooth communication with the moved station.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 1 roughly shows the configuration of a wireless LAN;

FIG. 3 is a flow diagram for explaining a conventional method of moving a station; and FIG. 4 is a flow diagram for explaining a method of moving a station according to the present invention.

DETAILED DESCRIPTION OF PREFERRED EMBODIMENT

Reference will now be made in detail to the preferred embodiments of the present invention, examples of which are illustrated in the accompanying drawings.

Figure 1:
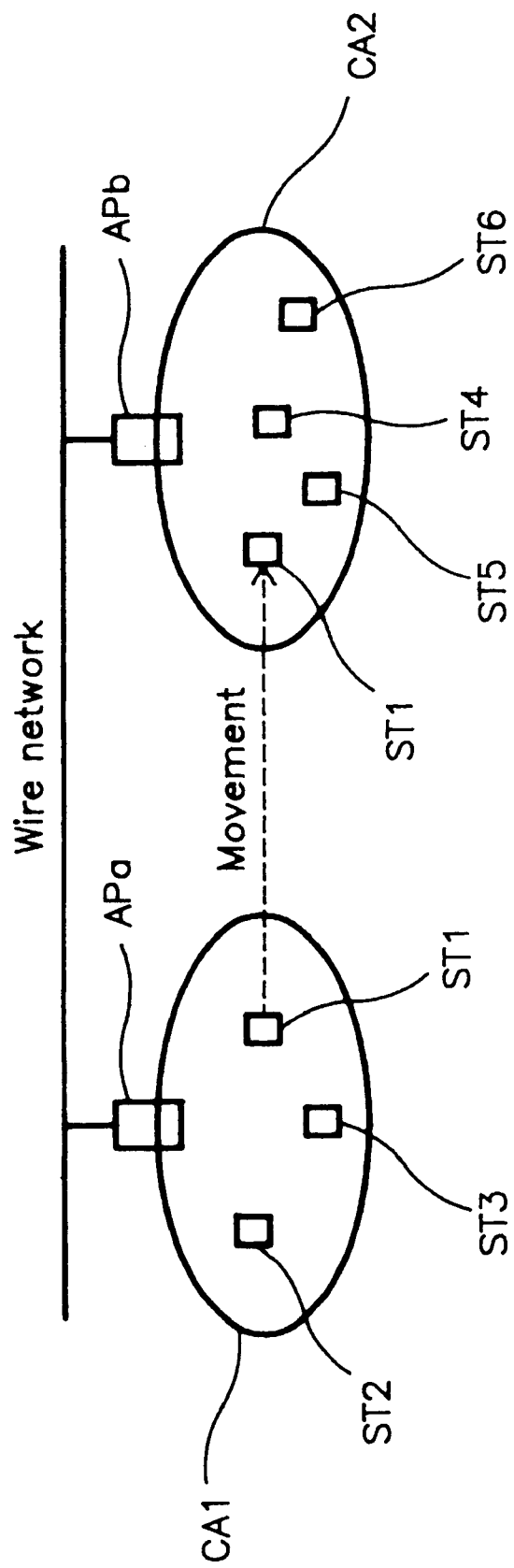
Figure 2:
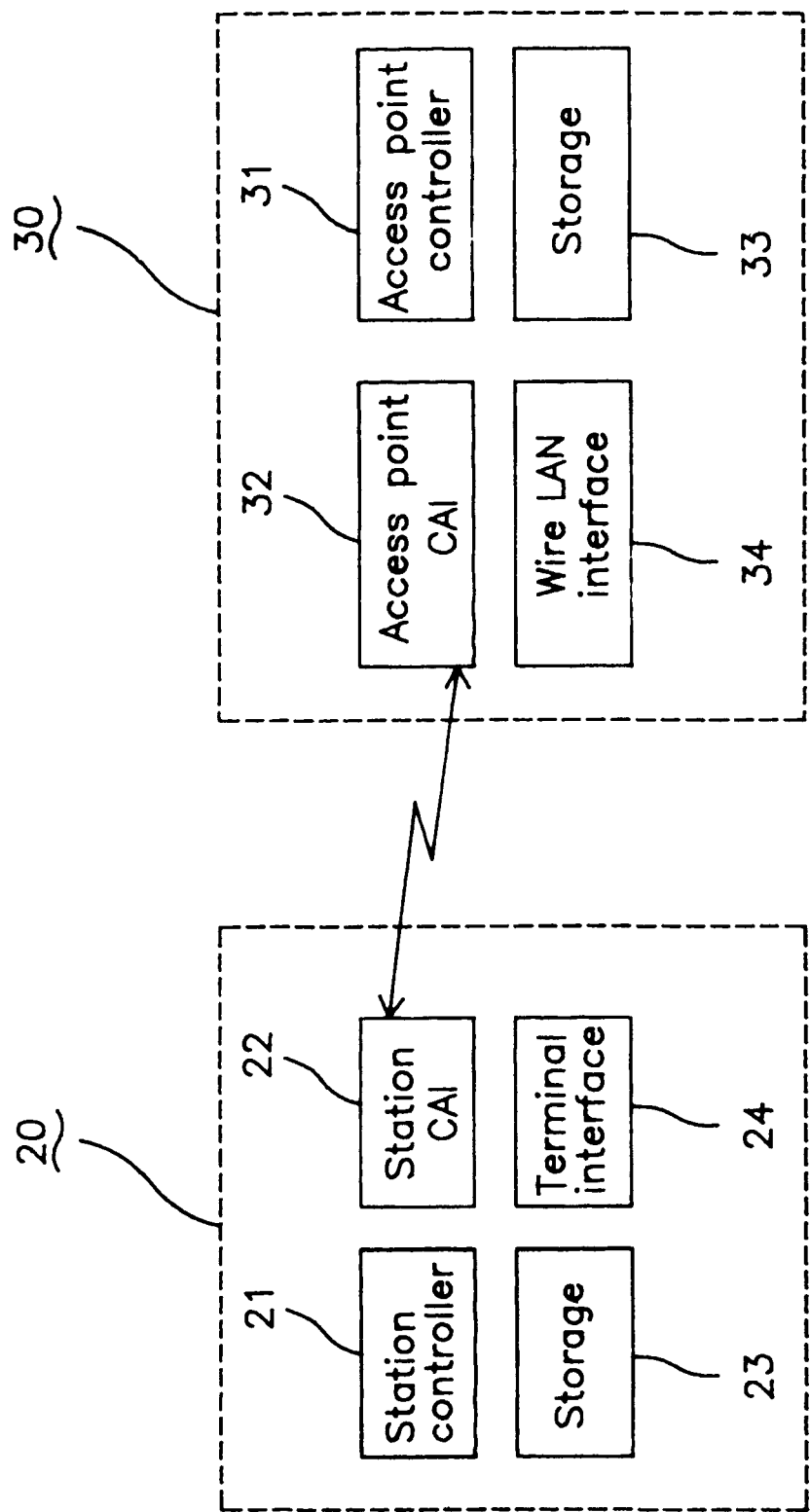
FIG. 2 is a block diagram showing the configuration of a station and access point of a wireless LAN.

The present invention is constructed in such a manner that, when a station moves in a wireless LAN shown in FIGS. 1 and 2, the moving station transmits information about the access point of a communication area, where it was located, to the access point of a communication area, to which it will move. When station ST1 moves from first communication area CA1 to second communication area CA2, for example, the station movement according to the present invention is carried out using the method shown in FIG. 4.

First, when station ST1 is located in first communication area CA1, it recognizes that first access point APa of first communication area CA1 is connected thereto, and stores corresponding connection information in an initial access point record area in its storage 23 (S31). When station ST1 moves from first communication area CA1 to second communication area C2, it requires first access point APa to cancel the connection with station ST1 by way of radio channel CAI 22 (S32). Then, first access point APa deletes station ST1 from the connection station list stored in its storage 33, simultaneously, registers station ST1 on its connection cancellation station list (S33). By doing so, first access point APa cancels the connection with the station.

When station ST1 moves to second communication area CA2, the station requires second access point APb of second communication area CA2 to be connected thereto (S34). Here, second access point APb registers station ST1 on the connection station list stored in its storage 33 (S35). Station ST1 sends information about first access point APa, stored in its initial access point record area, to second access point APb, to thereby inform second access point APb that station ST1 moved from first communication area CA1 (S36).

Then, second access point APb registers the information about first access point APa of first communication area CA1, where station ST1 was located, in its storage 33, and informs the first access point that station ST1 moved thereto (S37). Here, first access point APa registers second access point APb in station destination information record area included in its storage (S38). Thus, station moving operation is completed (S39).

That is, when station ST1, which was located in first communication area CA1, moves to second communication area CA2, station ST1 is disconnected from first access point APa, and informs the first access point that it will move to another communication area. Thereafter, station ST1 moves to second communication area CA2, to be connected with second access point APb. First access point APa registers station ST1 in the connection cancellation station list stored in its storage. When station ST1 informs second access point APb that it moved from first communication area CA1, second access point APb informs first access point APa that station ST1 moved to second communication area CA2 through the wire network.

Thus, first access point APa registers second access point APb in the station destination information record area included in its storage, to thereby recognize the station movement to second communication area CA2. Accordingly, communication information, which is sent from other stations ST2 and ST3 in first communication area CA1 to station ST1, is transmitted to second access point APb through the wire network. Second access point APb can send the communication information from first access point APa to station ST1 by way of radio channel CAI.

As described above, according to the present invention, when a station moves from a communication area having an access point to another communication area having an access point, information about the access point of a communication area where the station was located is sent to the access point of a communication area to which the station will move, to perform smooth communication with the moved station.

It will be apparent to those skilled in the art that various modifications and variations can be made in the method of moving a station in a wireless LAN of the present invention without departing from the spirit or scope of the invention. Thus, it is intended that the present invention cover the modifications and variations of this invention provided they come within the scope of the appended claims and their equivalents.

What is claimed is:

1. A method of moving a station in a wireless local area network (LAN), comprising the steps of:

a station recognizing that a first access point of a first communication area is connected thereto, when the station is located in the first communication area, and storing corresponding connection information in an initial access point record area of its storage;

the station requiring the first access point to cancel the connection with the station, when the station moves from the first communication area to a second communication area;

the first access point cancelling the connection with the station, deleting the station on a connection station list stored in its storage, simultaneously, registering the station on its connection cancellation station list;

the station requiring a second access point of the second communication area to be connected thereto, when the station moves to the second communication area;

the second access point registering the station on the connection station list stored in its storage;

the station transmitting connection information about the first access point, stored in its initial access point record area, to the second access point, to inform the second access point that the station moved from the first communication area;

the second access point registering the information about the first access point of the first communication area where the station was located in its storage, and then informing the first access point that the station moved to the second communication area of the second access point; and the first access point registering the second access point in a station destination information record area included in its storage.

* * * * *